United States Patent
Moraca

(10) Patent No.: US 12,435,992 B2
(45) Date of Patent: Oct. 7, 2025

(54) VEHICLE SAFETY APPARATUS AND NAVIGATION SYSTEM

(71) Applicant: Patrick M. Moraca, Scottsdale, AZ (US)

(72) Inventor: Patrick M. Moraca, Scottsdale, AZ (US)

( * ) Notice: Subject to any disclaimer, the term of this patent is extended or adjusted under 35 U.S.C. 154(b) by 154 days.

(21) Appl. No.: 18/380,146

(22) Filed: Oct. 13, 2023

(65) Prior Publication Data

US 2024/0110810 A1 Apr. 4, 2024

Related U.S. Application Data

(63) Continuation-in-part of application No. 17/465,512, filed on Sep. 2, 2021, now Pat. No. 11,807,245.

(51) Int. Cl.
*G01C 21/00* (2006.01)
(52) U.S. Cl.
CPC ............................... *G01C 21/3844* (2020.08)
(58) Field of Classification Search
CPC ............... G01C 21/3844; G01C 21/30; G01C 21/3697; G01C 21/3822; B60W 2050/146; B60W 2556/10; B60W 2556/45; B60W 40/10; B60W 50/14; B60W 40/076
See application file for complete search history.

(56) References Cited

U.S. PATENT DOCUMENTS

| | | | |
|---|---|---|---|
| 9,849,834 B2 * | 12/2017 | Reed | B60W 50/0098 |
| 2019/0061784 A1 * | 2/2019 | Koehler | B60W 50/14 |
| 2019/0145783 A1 * | 5/2019 | Geisler | G08G 1/0112 701/446 |
| 2022/0169286 A1 * | 6/2022 | Radabaugh | G01C 21/3461 |
| 2022/0185312 A1 * | 6/2022 | Hegde | G08G 1/056 |
| 2022/0219716 A1 * | 7/2022 | McAlister | G08G 1/167 |

* cited by examiner

*Primary Examiner* — Michael V Kerrigan
*Assistant Examiner* — Tanya C Sienko
(74) *Attorney, Agent, or Firm* — PARSONS & GOLTRY; Robert A. Parsons; Michael W. Goltry

(57) ABSTRACT

A vehicle navigation system for use in vehicles traveling on roadways. The apparatus including a vehicle with a computer having accelerometers and gyroscopes coupled to provide signals compensating for acceleration, velocity, and centripetal forces produced by movement of the vehicle. A color-coded slope map stored in the computer. A simulated color wheel overlying a level bubble matrix within the computer with a fixed orientation relative to the vehicle. The matrix including a simulated bubble floating within the matrix, and the signals applied to the simulated bubble so that the position of the bubble and the color of the bubble is only dependent upon the orientation of the vehicle. The computer comparing the color of the slope map to the color of the bubble at each location along the slope map and providing a vehicle location when the color of the slope map and the color of the bubble match.

13 Claims, 5 Drawing Sheets

VEHICLE SAFETY APPARATUS AND NAVIGATION SYSTEM

CROSS-REFERENCE TO RELATED APPLICATIONS

This application is a continuation-in-part of and claims the benefit of U.S. patent application Ser. No. 17/465,512, filed 2 Sep. 2021.

FIELD OF THE INVENTION

This invention relates to safety apparatus for use with vehicles, such as automobiles, to prevent wrong-way collisions and the like and vehicle navigation systems.

BACKGROUND OF THE INVENTION

Because of the complexity of roads in the present day, many drivers get confused or do not pay proper attention to their driving. This confusion or inattention can result in wrong-way crashes and serious injury to people who are simply following the road. Many prior art attempts to solve this problem, including extra signage at trouble spots, have been suggested and implemented. However, once a driver becomes confused, extra signage may simply add to the confusion.

Self-driving vehicles employ sensors which determine the static and dynamic environment through which the vehicle travels. In attempts to navigate self-driving vehicles, many sensors, including line of sight sensors (LoS) such as cameras and Light Detection and Ranging (LIDAR), are used for both static and dynamic navigation. The sensors provide a great deal of data which requires processing, is complicated, expensive, and computationally intensive, overburdening the navigation system, resulting in slowed response or the requirement for more processing power. Additionally, line of sight sensors require visibility and can be impeded when visibility is limited It would be highly advantageous, therefore, to remedy these and other deficiencies inherent in the prior art.

Accordingly, it is an object of the present invention to provide new and improved vehicle safety apparatus for providing a warning when a driver is entering a trouble spot.

It is another object of the present invention to provide new and improved vehicle safety apparatus for providing a warning that a trouble spot has been entered.

It is yet another object of the present invention to provide static navigation so as to allow conventional sensor and processes to be optimized to provide dynamic navigation.

SUMMARY OF THE INVENTION

Briefly to achieve the desired objects and advantages of the instant invention, provided is a vehicle navigation system for use in vehicles traveling on roadways. The vehicle navigation system includes a vehicle having an onboard computer and accelerometers and gyroscopes, the accelerometers and gyroscopes are coupled to provide signals compensating for acceleration, velocity, and centripetal forces produced by movement of the vehicle. The vehicle has a longitudinal slope ($S_L$) and a cross slope ($S_X$) defining the vehicle orientation relative to the roadway. A coordinate system slope map is supplied in the onboard computer. A simulated free-floating bubble is within the onboard computer. The bubble has a fixed orientation relative to the vehicle and the bubble has a coordinate locus of the coordinate system dependent upon the vehicle longitudinal slope ($S_L$) and cross slope ($S_X$), and the signals compensating for acceleration, velocity, the centripetal forces produced by movement of the vehicle applied to the simulated bubble so that the position of the bubble and coordinate locus is dependent only upon the orientation of the vehicle. The onboard computer compares the coordinate system slope map to the coordinate locus of the bubble at each location along the slope map and providing a location when the coordinate locus of the slope map and the coordinate locus of the bubble match. In another aspect, the coordinate system can be a color-coded system and the coordinate locus are designated colors.

The desired objects and advantages of the instant invention are further achieved in a preferred example of safety apparatus for use in vehicles traveling on highways. The safety apparatus including a vehicle having a computer with accelerometers and gyroscopes coupled to provide signals compensating for acceleration, velocity, and centripetal forces produced by movement of the vehicle. A color-coded slope map stored in the computer. A simulated color wheel overlying a level bubble matrix within the onboard computer with a fixed orientation relative to the vehicle, the level bubble matrix including a simulated bubble floating within the level bubble matrix, and the signals compensating for acceleration, velocity, the centripetal forces applied to the simulated bubble so that the position of the bubble and the color of the bubble is only dependent upon the orientation of the vehicle. The color wheel including an array of colors and their compliments. The computer compares the color of the slope map to the color of the bubble at each location along the slope map and providing a location when the color of the slope map and the color of the bubble match.

The desired objects and advantages of the instant invention are further achieved in a preferred example of a method of providing safety warnings for use in vehicles traveling on highways. The method including the steps of supplying a vehicle having a longitudinal slope ($S_L$) and a cross slope ($S_X$), the vehicle including an onboard computer with accelerometers and gyroscopes coupled to provide signals compensating for acceleration, velocity, and centripetal forces produced by movement of the vehicle. Providing a color coded slope map in the onboard computer of the vehicle. Simulating in the onboard computer a level bubble matrix including a semispherical dome shaped housing filled with a clear liquid with a bubble freely moving inside the housing and simulating in the onboard computer a color wheel overlying the level bubble matrix, the color wheel including an array of colors and their compliments, the color wheel overlying the level bubble matrix mounted in the vehicle so that the bubble presents a color from the color wheel indicating the longitudinal slope ($S_L$) and the cross slope ($S_X$) of the vehicle. The onboard computer comparing the color of the slope map to the color of the bubble at each location along the slope map traveled by the vehicle and providing a location when the color of the slope map and the color of the bubble match.

BRIEF DESCRIPTION OF THE DRAWINGS

Specific objects and advantages of the invention will become readily apparent to those skilled in the art from the following detailed description of a preferred example thereof, taken in conjunction with the drawings in which.

DETAILED DESCRIPTION OF THE DRAWINGS

For purposes of the present invention the term "roadway" is used herein to represent all surfaces on which vehicles may travel, including but not limited to highways, side roads, access roads, city streets, country lanes, etc. and is defined to include any or all of the above. Also, for purposes of this invention the term "vehicle" is defined as any device that can travel along a roadway, including but not limited to automobiles (cars), pick-up trucks, trucks, etc.

Figures 1A, 1B:
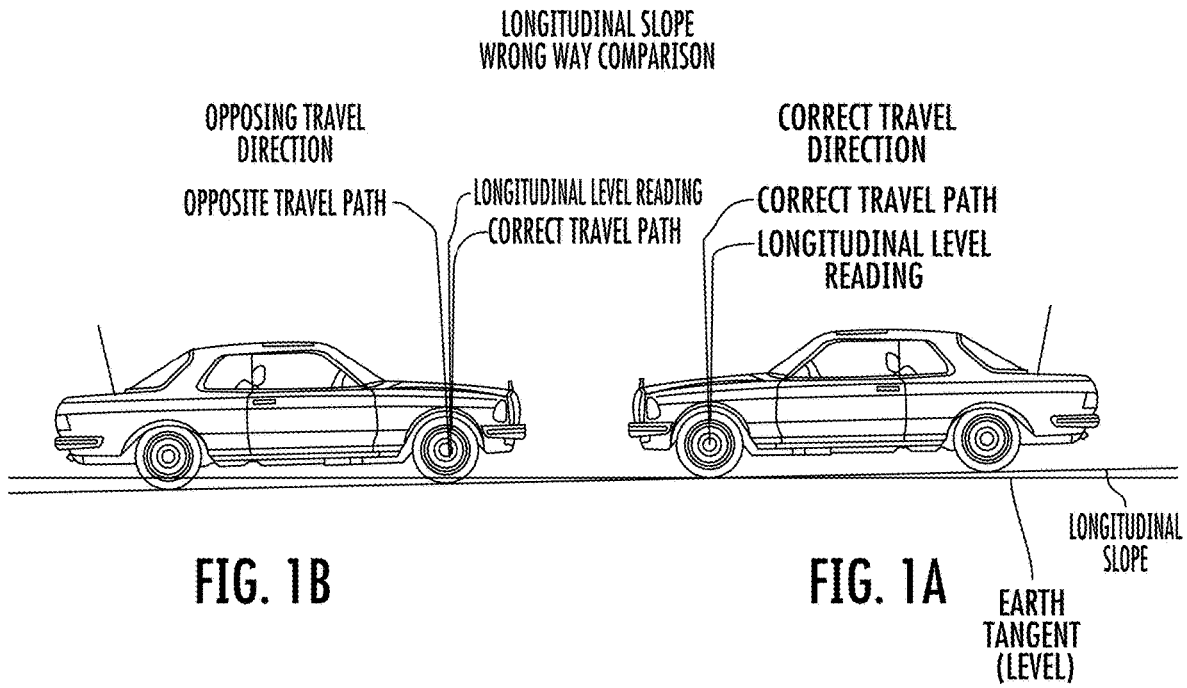
FIGS. 1A and 1B illustrate automobiles travelling on a sloped highway.
Figure 2:
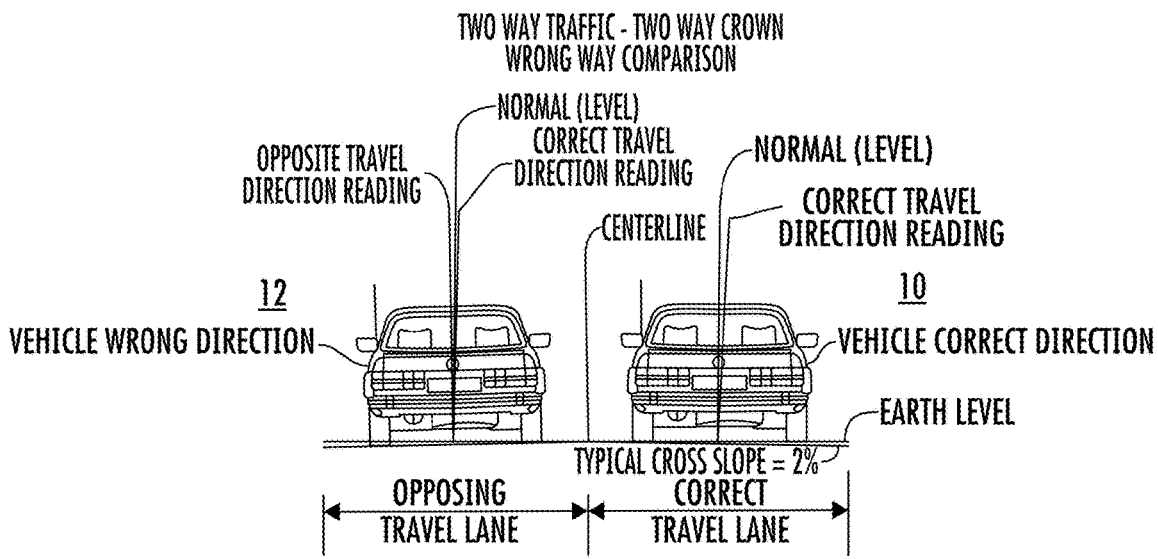
FIG. 2 illustrate automobiles travelling in opposite lanes on a two-way roadway.

The tactile interface between a vehicle and the travel surface results in a measurable longitudinal slope and cross slope. Longitudinal slope is measured as the vehicles forward facing slope front to back of the travel surface that a human occupant associates with traveling uphill or downhill. Illustrated in FIG. 1A as an automobile traveling downhill and in FIG. 1B as an automobile traveling uphill. Cross slope is measured as the vehicles side to side slope of the travel surface which the human occupant typically does not perceive unless it deviates from standards. Cross slope is illustrated in FIG. 2 with two automobiles traveling on a two-lane road with a two-way crown. Automobile 10 on the right-hand side slopes downwardly to the right and automobile 12 on the left-hand side slopes downwardly to the left. The longitudinal and cross slope components provide the difference from "location level" of the vehicle relative to the travel surface. At each geographic location this slope combination remains a largely reliable indicator of the vehicles location regardless of availability or limitations of visual indicators.

The reliability of the travel surface slopes allows various mapping methods to be used to assist in determining the vehicles geographic location and direction regardless of the visual indicators. Slope mapping is based on fixed long term engineered and constructed travel surface conditions. Engineered travel surfaces are designed to typical engineering standards at federal, state, and local levels. Slope mapping methods may include but are not limited to a level bubble, slope vectors, slope color coding, matrix look-up tables, etc. A color-coded slope map is a map that assigns a specific color in a selected array of colors to every point along a roadway, where the color represents the longitudinal slope ($S_L$) and cross slope (Sx) of the roadway surface at that point. In the present invention, the preferred mapping method is to accumulate slope information from prior travelers stored on the web, cloud or automotive manufacturer mapping database(s) (i.e. Tesla). Some typical sources are topographic mapping satellite, survey, AS-built, government records, GIS, GPS, Lidar, grid, DTM, tiles (avionics, Tesla and Google supplied}. This information is integrated into one map and the map is color-coded to match the color coding system described below.

At the present time vehicles either include or can be provided with accelerometers and gyroscopes designed or programmed to provide signals compensating for acceleration, velocity, and centripetal forces produced by movement of the vehicle. Also, a computer is included in all vehicles at the present time, generally referred to as an onboard computer.

Figure 3:
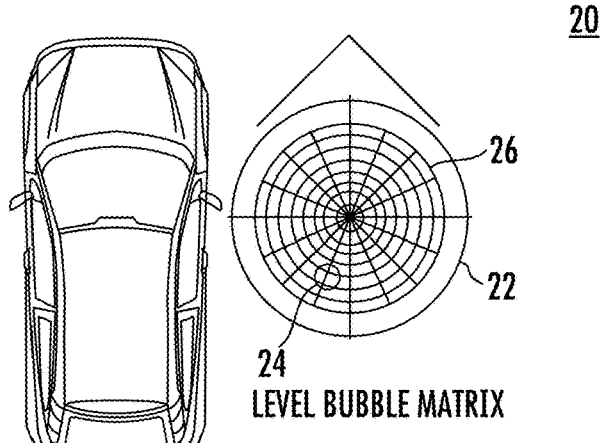
FIG. 3 is a top plan view of a level bubble matrix.
Figure 4:
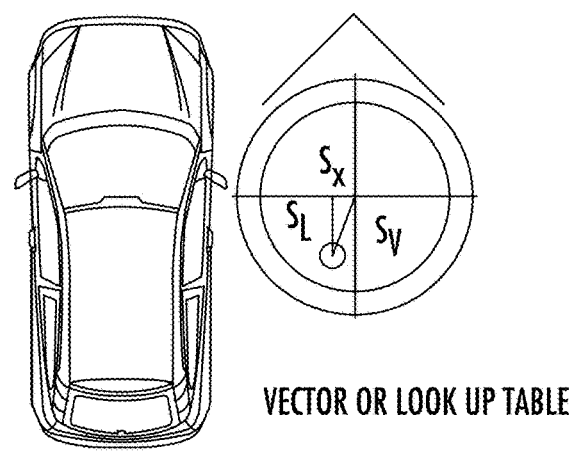
FIG. 4 is a top plan view of a vector or look-up table for a bubble matrix.

For purposes of explanation only, a level bubble matrix 20 is illustrated in FIG. 3. Matrix 20 includes a semispherical dome shaped housing 22 filled with a clear liquid with a bubble 24 freely moving inside. Concentric circles 26 are delineated and divided or parsed into an array that results in a circular matrix representing the typical travel surfaces encountered. Level bubble matrix 20 is a representation of the travel direction slope (Sv) (see FIG. 4) and incorporates a quadrant slope system in addition to slope tolerances (i.e. $\pm S_v$). The quadrant system introduces the dividing lines of the positive and negative of longitudinal slope ($S_L$) and the cross slope ($S_X$) and the matrix division of positive and negative halves of each slope.

Figure 5:
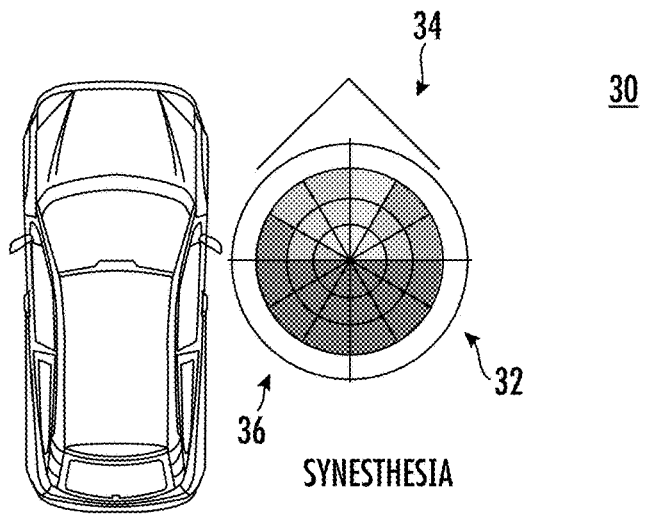
FIG. 5 is a top plan view of a color wheel.

Also, for purposes of explanation only, a color wheel 30 is illustrated in FIG. 5. In color wheel 30 the primary colors, red designated 32, yellow designated 34, and blue designated 36, are separated by 120 degrees and include secondary colors. Tertiary colors may be included depending upon the level of slope detail desired. While the primary colors are used in this example, it will be understood that any array of colors can be used/selected as long as the colors of the slope map correspond with the colors of the color wheel. In the present invention, the computer onboard the subject vehicle is programmed to simulate color wheel 30 placed over level bubble matrix 20 which allows for a unique condition for comparing a vehicles location traveling in the correct direction relative to a map representing the correct mapped color to the travel surface slope direction. While an actual bubble in an actual matrix would be subjected to acceleration, velocity, and centripetal forces produced by movement of the vehicle, a simulated bubble 24 in a simulated matrix 20 is subjected to the signals compensating for acceleration, velocity, and centripetal forces produced by movement of the vehicle. Thus, the simulated bubble is an accurate indication of the exact position of the vehicle relative to the roadway and, through the simulated color wheel has a color representative of the orientation of the vehicle relative to the roadway.

The mapped color at any travel surface location is compared to the color position of simulated bubble 24 in the simulated color wheel 30 of the travel vehicle. Colors can be described and mixed using standard color designations (e.g. similar to mixing paint) or the colors can be described and mixed using digital designations. In the present invention the comparison is completed within the onboard computer.

Figure 6:
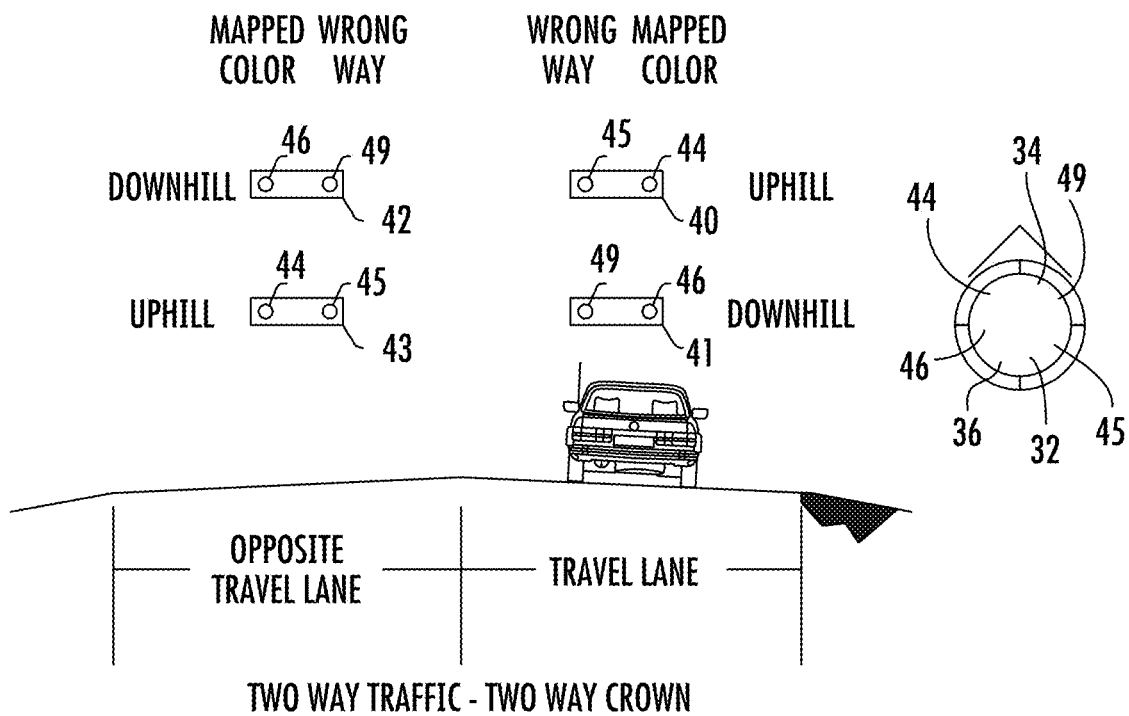
FIG. 6 illustrates a two-way highway with a two-way crown (peaked in the center) with four different possible positions for vehicles.

Turning now to some typical examples of map and color wheel operation, FIG. 6 through FIG. 12 illustrate several different highway situations. Turning specifically to FIG. 6, a two-way highway with a two-way crown (peaked in the center) is illustrated. Four different possible positions for vehicles are illustrated and designated 40 through 43. In position 40, the vehicle is traveling uphill in the right-hand lane. Thus, the vehicle is tilted clockwise toward the right and the front is higher than the back. This position moves bubble 24 into the upper left-hand quadrant of level bubble matrix 20 or in the green area of color wheel 30 (indicated by green dot 44 in position 40). The green of the color wheel/bubble will match the green of the map indicating that the vehicle is traveling in the correct direction. If the vehicle in position 40 is turned around, bubble 24 will move into the lower left quadrant, which is the compliment of the green map color, and the color of bubble 24 (indicated by dot 45 in position 40) will turn black or brown (if the colors are mixed like paint) or white or black (if the colors are mixed digitally) indicating that the vehicle is travelling in the wrong direction.

Using the above description, it can be seen that for a vehicle in position 41 traveling down-hill in the right-hand lane bubble 24 will be blue (dot 46) indicating the vehicle is traveling in the correct direction and if the vehicle is turned around the bubble color and map color will be compliments producing a black or brown dot 49 indicating a wrong direction. Similarly, a vehicle in position 42 traveling down-hill in the left-hand lane generates a purple dot 49 and a vehicle traveling uphill in the left-hand lane generates a black or brown dot 46. Finally, a vehicle in position 43 traveling uphill in the left-hand lane generates a green dot 45 and a vehicle traveling down-hill in the left-hand lane generates a black or brown dot 44.

Figure 7:
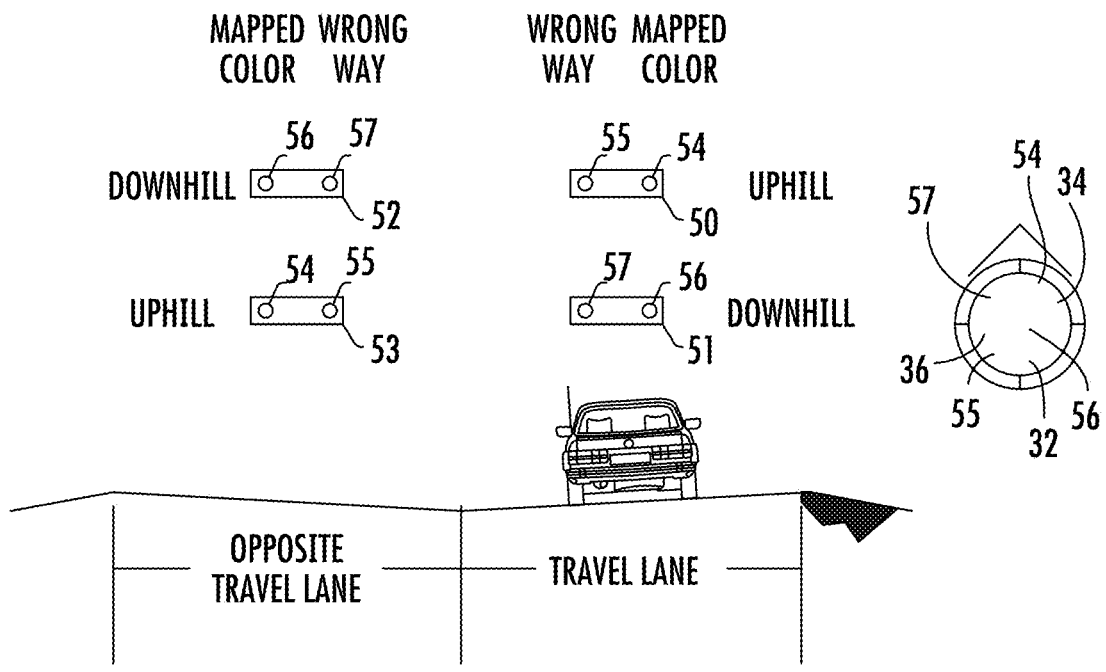
FIG. 7 illustrates a two-way highway with an inverted crown (dip in the center) with four different possible positions for vehicles.
Figure 8:
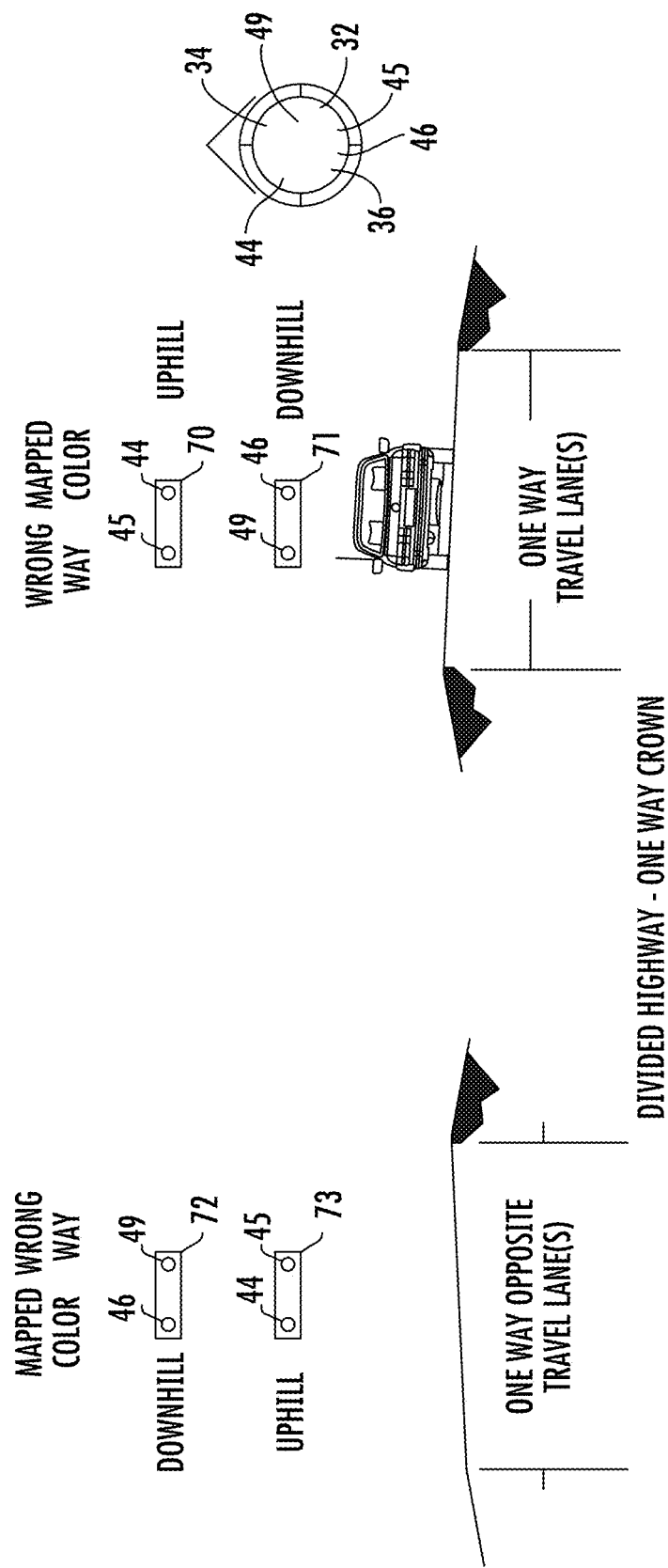
FIG. 8 illustrates four possible vehicle positions on a divided highway with one lane in each direction.

Turning specifically to FIG. 7, a two-way highway with an inverted crown (dip in the center) is illustrated. Four different possible positions for vehicles are illustrated and designated 50 through 53. In position 50, the vehicle is traveling uphill in the right-hand lane. Thus, the vehicle is tilted counter-clockwise toward the center of the highway and the front is higher than the back. This position moves bubble 24 into the upper right-hand quadrant of level bubble matrix 20 or in the yellow/red area of color wheel 30 (indicated by dot 54 in position 50) which matches the map indicating safe direction. If the vehicle in position 50 turns around (downhill) the bubble color will be the compliment of the map color indicating travel in the wrong direction.

In position 51, the vehicle is moving down-hill in the right-hand lane so that bubble 24 is in the lower right-hand quadrant of level bubble matrix 20 or in the red/purple area of color wheel 30 (indicated by dot 56) which matches the map indicating safe direction. A change in direction results in the bubble color (indicated by dot 57) being the compliment of the map color indicating travel in the wrong direction. Similarly, in position 52 the vehicle is traveling downhill in the left-hand lane and in position 53 the vehicle is traveling uphill in the left-hand lane. Applying the above explanation, in both instances the vehicles will exhibit a color matching the map. However, a reversal of direction produces complimentary colors indicating a wrong direction.

Turning specifically to FIG. 7, a two-way highway with an inverted crown (dip in the center) is illustrated. Four different possible positions for vehicles are illustrated and designated 50 through 53. In position 50, the vehicle is traveling uphill in the right-hand lane. Thus, the vehicle is tilted counter-clockwise toward the center of the highway and the front is higher than the back. This position moves bubble 24 into the upper right-hand quadrant of level bubble matrix 20 or in the yellow/red area of color wheel 30 (indicated by dot 54 in position 50) which matches the map indicating safe direction. If the vehicle in position 50 turns around (downhill) the bubble color will be the compliment of the map color indicating travel in the wrong direction (indicated by dot 55).

Using the above concept, by supplying a color-coded slope map (e.g. by storing in the computer, supplying over the air such as WIFI, satellite, etc.) within the onboard computer and simulating a color wheel overlaying a level bubble matrix in a vehicle, the color of the slope map and the color of the bubble in the bubble matrix can be compared or mixed at each and every location traveled to determine when/if a wrong way has occurred. This can be accomplished in its simplest form by simply overlying the slope map with the bubble matrix in the onboard computer. In general terms, this arrangement is referred to as a comparator comparing or mixing the color of the slope map to the color of the bubble at each location along the slope map and providing a warning when the color of the slope map and the color of the bubble are compliments.

When the color of the slope map and the color of the bubble in the bubble matrix match a pure color will be produced to indicate there is no problem. When a wrong way occurs, the colors will be compliments and a black, brown or white mix will be produced. Because the slope map and the bubble matrix are present only in the onboard computer in a machine readable form, the driver is never aware of the situation (i.e. correct way color or wrong way color). Thus, some form of warning (bells, whistles, colored flashing lights, etc.) is provided by the onboard computer which is activated when complimentary colors are sensed. Additionally, while the warning signal can take many forms for the operator of the vehicle, it can also take the form of a warning to other vehicles having this system, and can also be a signal broadcast to other devices such as smart phones and the like, in a manner similar to an amber alert. The known technology of Vehicle-to-vehicle (V2V) communication enables vehicles to wirelessly exchange information. The technology behind V2V communication allows vehicles to broadcast and receive omni-directional messages (up to 10 times per second), creating a 360-degree "awareness" of other vehicles in proximity. Vehicles equipped with appropriate software (or safety applications) can use the messages from surrounding vehicles, such as the warning of the present invention, to alert drivers and allow the ability to take action to avoid crashes. These V2V communication messages have a range of more than 300 meters and can detect dangers obscured by traffic, terrain, or weather.

While the previously described safety system uses vehicle orientation in comparison with detailed color-coded slope maps to determine position for safety reasons, vehicle orientation can also be employed in a navigation system to support level 0-5 autonomous driving. In typical navigation systems, GPS is used to provide a general location which can be plotted relatively accurately on a Geographic Information system (GIS) map. However, GPS has a radius tolerance (errors in the location) and is insufficiently accurate for level 3-5 autonomous driving. These errors increase with driving speed. The navigation system of the present invention employs vehicle orientation, at any specific moment, compared to a color-coded slope map in an area indicated by the GPS location and the last point of reference. As described previously, the tactile interface between a vehicle and the travel surface results in a measurable longitudinal slope and cross slope as described in conjunction with FIGS. 1a and 1b and FIG. 2. The reliability of the travel surface slopes allows various mapping methods to be used to assist in determining the vehicles geographic location and direction regardless of the visual indicators. Slope mapping is based on fixed long term engineered and constructed travel surface conditions. Engineered travel surfaces are designed to typical engineering standards at federal, state, and local levels. A color-coded slope map is a GIS map with enhanced data that assigns a specific color in a selected array of colors to every point along a roadway, where the point represents the longitudinal slope ($S_L$) and cross slope (Sx) of the roadway surface at that point. For purposes of explanation only, a level bubble matrix 20 is illustrated in FIG. 3. Matrix 20 includes a semispherical dome shaped housing 22 filled with a clear liquid with a bubble 24 freely moving inside. Concentric circles 26 are delineated and divided or parsed into an array that results in a circular matrix representing the typical travel surfaces encountered. Level bubble matrix 20 is a representation of the travel direction slope (Sv) (see FIG. 4) and incorporates a quadrant slope system in addition to slope tolerances (i.e. $\pm S_v$). The quadrant system introduces the dividing lines of the positive and negative of longitudinal slope ($S_L$) and the cross slope ($S_X$) and the matrix division of positive and negative halves of each slope.

In this manner, the GPS location data can be refined to a location accurate enough for static autonomous driving. Using the present system, a vehicle's position can be accurately determined at any time, in real time and at highway speeds. By combining GPS location, color coded slope maps and vehicle orientation, an accurate location of the vehicle is provided while reducing navigation function requirements for LoS sensors in a ADAS system. Reducing the LoS sensor navigation requirements frees the computer processing STACK for the camera or LiDAR based driving solution methods to solve more challenging dynamic variables a vehicle encounters while traveling.

The present navigation system separates static and dynamic based navigation. The static solutions are designed to develop and introduce color-coded slope maps to navigate the static roadway conditions. The dynamic systems manage and prioritize vehicle based ADAS and sensors to allow high technology sensors and software to effectively separate static navigation from constantly changing dynamic vehicle traffic navigation conditions.

Figure 9:
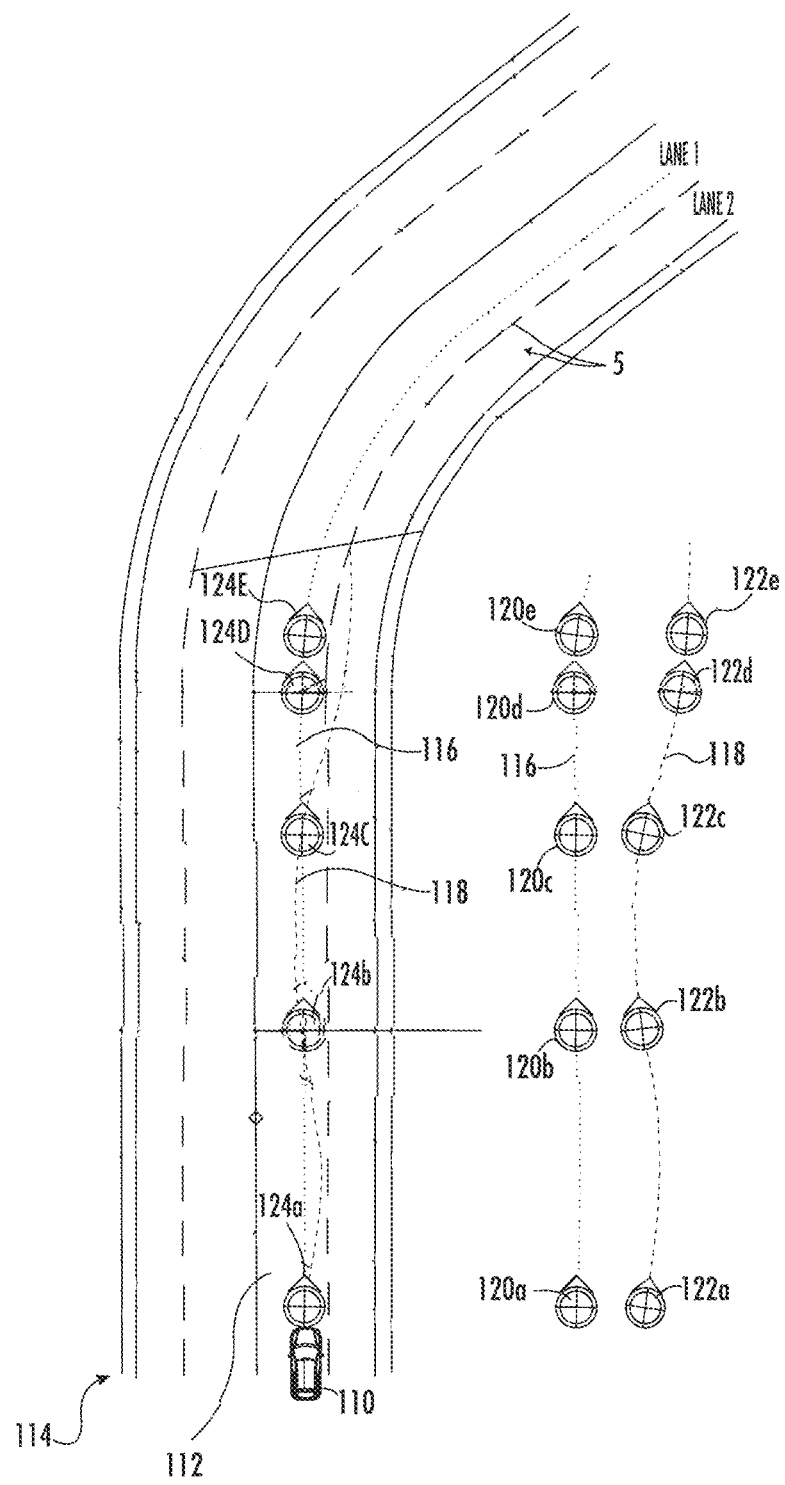
FIG. 9 illustrates a schematic representation of a comparison between vehicle orientation along a travel path and road surface geometry to determine the location of a vehicle.

Turning now to FIG. 9, a schematic representation of a comparison between specific vehicle orientations of a vehicle 110 having various travel paths, as different examples, and road surface geometries along a lane 112 of a roadway 114 is illustrated. A first example of a travel path is indicated by dotted line 116 and the second example of a travel path is indicated by broken line 118, both are intending to travel within lane 112. Vehicle orientations for locations along the travel path indicated by dotted line 116 are each illustrated by a simulated level bubble matrix 120a-e, vehicle orientations for locations along the travel path indicated by broken line 118 are each illustrated by a simulated level bubble matrix 122a-e. The travel path indicated by dotted line 116 and the travel path indicated by broken line 118, with associated simulated level bubble matrix 120a-e and 122a-e, are moved to the side in the illustration for purposes of clarity. Road surface geometries illustrated are for a travel path in lane 112 of roadway 114, and each is illustrated by simulated level bubble matrix 124a-e, at points there along.

The vehicle orientation (the color position of simulated bubble 24 within simulated level bubble matrix 20) and the road surface geometry (the longitudinal slope (SL) and cross slope (Sx)) as indicated by an assigned color, are compared as the vehicle travels. The color orientation of the vehicle is matched to the color-coded slope map to determine the position of the vehicle within the error radius of the GPS radius tolerance. As can be seen when vehicle 110 is on roadway 114, its position is determined by comparing the color determined by the vehicle orientation and the color for a position on the color-coded slope map. When a matching color is determined, the location of the vehicle is located on the color-coded slope map for that instant in time. In this example, simulated level bubble matrix 120a matches simulated level bubble matrix 124a placing the vehicle at this location along travel path 116. Alternatively, simulated level bubble matrix 122a does not match simulated level bubble matrix 124a, indicating that the vehicle is swerving or changing lanes. If vehicle continues on in the adjacent lane, it will be located by matching color points on the map therein. Travel path 116 matches lane 112 at each point, while swerving path 118 does not match. This can be used to indicate location along the desired path, indicate a lane change, if the following points match for the changes lane, or unsafe or intoxicated driving if the swerving continues. Signals or indication can be used to indicate these instances.

In some instances, road geometries can be identical between lanes. In these relatively rare instances, additional data may be required to determine specific location. An example of this is a travel surface divided roadway with both opposing travel lanes with a one-way crown in the same direction. This is commonly found as a typical design condition for superelevated horizontal curves. The condition also occurs in rare situations along a linear roadway alignment designed for drainage transitions and topographic constrained areas. If the road geometries are not different enough in these instances to be differentiated by comparison between lanes, additional data such as wheel rotations and distance, provided by the ADAS system, would supplement the information and place the vehicle. This can be computed because lanes on a curve have different lengths. Rotation of the wheels supplies the distance traveled, and when combined with the road geometries, determines the lanes traveled. Other instances can be found, but supplemental data will overcome the problem.

It should be noted that while color coding is preferred, the color-coded system can be replaced with a coordinate system wherein the position of simulated bubble 24 within simulated level bubble matrix 20 can be a coordinate locus instead of a color and can be matched to a coordinate locus of the roadway geometry instead of a color. While a coordinate system can be used, the color system is preferred because it is less data intensive for the same information. Vehicle orientation data is compressed into a single representative color. The vehicle color is compared to GIS map data using the same color compression technology. The color compression technology used turns vehicle direction, roadway longitudinal slope and roadway cross slope at each point along a GIS map travel lane into a single-color data point. The GIS single-color data point compresses various methods of larger data lookup methods of listing X, Y and Z of a vehicle location which can be used as mentioned. Location lookup data may take the form of traditional cartesian X, Y, Z; spirit level polar coordinates; or spirit level longitudinal slope and cross slope. Matching vehicle and GIS map color data allows the vehicle to engage in predictive navigation without relying on line-of-sight detectors. Accurate vehicle location data leads to reliable vehicle navigation without adding more satellites or adding expensive sensors. The present location system, engaged in predictive navigation, is also capable of providing safety warnings across level 0-5 autonomy. Available warnings range from instantaneous wrong way driving warnings to displaying in cabin warning signage based on driver speed behavior and approaching roadway geometry.

Traditional navigation using linear rectification assumes the vehicle is traveling in the correct direction when it locates the vehicle on a GIS map system snapping the location to the closest common roadway feature. The present color compression removes the assumption a vehicle is traveling in the correct direction used in traditional linear rectification. The present color compression technology laterally locates the vehicle, confirms the vehicle direction to the roadway geometry it is traveling upon and then longitudinally locates the vehicle along the travel path.

It will be understood that static navigation is using information on unchanging features of the driving environment such as roads and permanent obstacles. Roads have a profile and a shape, with curves and intersections that are unchanging. For self-driving navigation purposes, when a vehicle is accurately located, and accurate maps are provided, the navigation of a vehicle through static roads and obstacles is achieved. Dynamic variables to the environment, such as other vehicles, pedestrians and the like, require more sensors, such as LIDAR, cameras, radar and the like, and greater computing power to accurately determine the driving environment. In the present invention, the static environment is determined using vehicle orientation as previously described matched to a color map.

Thus, the present invention discloses and provides new and improved safety apparatus for providing a warning when a driver is entering a trouble spot or for providing a warning that a trouble spot has been entered. The safety apparatus will operate on virtually any highway being traveled and is relatively simple and easy to install in any vehicle. Additionally, the present invention also provides accurate and real-time location data at highway speeds to simplify higher level autonomous driving.

Various changes and modifications to the examples herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A vehicle navigation system for use in vehicles traveling on roadways comprising:
   a vehicle including an onboard computer and accelerometers and gyroscopes, the accelerometers and gyroscopes coupled to provide signals compensating for acceleration, velocity, and centripetal forces produced by movement of the vehicle, the vehicle having a longitudinal slope ($S_L$) and a cross slope ($S_X$) defining a vehicle orientation relative to the roadway;
   a coordinate system slope map supplied in the onboard computer;
   a simulated free-floating bubble within the onboard computer, the bubble having a fixed orientation relative to the vehicle and the bubble having a coordinate locus dependent upon the vehicle longitudinal slope ($S_L$) and cross slope (Sx), and the signals compensating for acceleration, velocity, the centripetal forces produced by movement of the vehicle applied to the simulated bubble so that the position of the bubble and coordinate locus is dependent only upon the orientation of the vehicle; and
   the onboard computer comparing the coordinate system slope map to the coordinate locus of the bubble at each location along the slope map and providing a location when a coordinate locus of the slope map and the coordinate locus of the bubble match.

2. The vehicle navigation system as claimed in claim 1 wherein the coordinate system slope map is color-coded and the coordinate locus is a color.

3. The vehicle navigation system as claimed in claim 2 wherein the color-coded slope map assigns a specific color in a selected array of colors to every point along a roadway representing the longitudinal slope ($S_L$) and cross slope (Sx) of a surface of the roadway at that point.

4. The vehicle navigation system as claimed in claim 3 wherein the color-coded slope map is an accumulation of slope information from prior travelers stored on web, cloud or automotive manufacturer mapping database(s).

5. The vehicle navigation system as claimed in claim 4 wherein the accumulation of slope information includes one or more topographic mapping satellite, survey, AS-built, government records, GIS, GPS, Lidar, grid, DTM tiles and, Tesla and Google avionics supplied.

6. A vehicle navigation system for use in vehicles traveling on roadways comprising:
   a vehicle including a computer with accelerometers and gyroscopes coupled to provide signals compensating for acceleration, velocity, and centripetal forces produced by movement of the vehicle;
   a color-coded slope map supplied in the computer;
   a simulated color wheel overlying a level bubble matrix within the computer with a fixed orientation relative to the vehicle, the level bubble matrix including a simulated bubble floating within the level bubble matrix, and the signals compensating for the acceleration, velocity, centripetal forces applied to the simulated bubble so that the position of the bubble and the color of the bubble is only dependent upon the orientation of the vehicle, and the color wheel including an array of colors; and
   the computer comparing the color of the slope map to the color of the bubble at each location along the slope map and providing a location when the color of the slope map and the color of the bubble match.

7. The vehicle navigation system as claimed in claim 6 wherein the array of colors includes the three primary colors and the color coded slope map is color coded with the three primary colors.

8. The vehicle navigation system as claimed in claim 6 wherein the roadways include any one of highways, side roads, access roads, city streets, or country lanes.

9. The vehicle navigation system as claimed in claim 6 wherein the vehicles include automobiles (cars), pick-up trucks, and trucks.

10. A method of providing vehicle location for use in vehicles traveling on roadways comprising the steps of:
   supplying a vehicle having a longitudinal slope ($S_L$) and a cross slope ($S_X$), the vehicle including an onboard computer with accelerometers and gyroscopes coupled to provide signals compensating for acceleration, velocity, and centripetal forces produced by movement of the vehicle;
   providing a color-coded slope map in the onboard computer of the vehicle;
   simulating in the onboard computer a level bubble matrix including a semispherical dome shaped housing filled with a clear liquid with a bubble freely moving inside the housing;
   simulating in the onboard computer a color wheel overlying the level bubble matrix, the color wheel including an array of colors, the color wheel overlying the level bubble matrix mounted in the vehicle so that the bubble presents a color from the color wheel indicating the longitudinal slope ($S_L$) and the cross slope ($S_X$) of the vehicle; and the onboard computer comparing the color of the slope map to the color of the bubble at each location along the slope map traveled by the vehicle and providing a vehicle location when the color of the slope map and the color of the bubble match.

11. The method as claimed in claim 10 wherein the color-coded slope map assigns a specific color in a selected array of colors to every point along a roadway representing the longitudinal slope ($S_L$) and cross slope (Sx) of the roadway surface at that point.

12. The method as claimed in claim 10 wherein the color-coded slope map is an accumulation of slope information from prior travelers stored on a web, cloud or automotive manufacturer mapping database(s).

13. The method as claimed in claim 12 wherein the accumulation of slope information includes one or more topographic mapping satellite, survey, AS-built, government records, GIS, GPS, Lidar, grid, DTM tiles and, Tesla and Google avionics supplied.

* * * * *